(12) United States Patent  
Iwamoto et al.

(10) Patent No.: US 9,052,872 B2
(45) Date of Patent: Jun. 9, 2015

(54) ELECTRONIC DEVICE

(71) Applicant: Panasonic Corporation, Osaka (JP)

(72) Inventors: Akira Iwamoto, Osaka (JP); Tadashi Matsunobe, Osaka (JP); Masaru Furujiku, Osaka (JP); Jun Satoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 187 days.

(21) Appl. No.: 13/951,027

(22) Filed: Jul. 25, 2013

(65) Prior Publication Data

US 2014/0185235 A1    Jul. 3, 2014

(30) Foreign Application Priority Data

Dec. 27, 2012  (JP) ................................ 2012-285287

(51) Int. Cl.
*G06F 1/16*    (2006.01)
(52) U.S. Cl.
CPC ................................... *G06F 1/1656* (2013.01)
(58) Field of Classification Search
USPC .......... 345/173, 156, 158, 169, 174, 172, 1.3, 345/104, 4, 102, 184; 361/679.02, 679.58, 361/679.21, 679.26, 679.06, 679.27, 361/679.09, 679.3, 679.56, 679.08, 679.33, 361/679.45, 679.29, 679.55, 679.04, 361/679.07, 679.47; 455/575.1, 336, 563, 455/566, 550.1, 557; 248/917, 921, 187.1, 248/228.3, 227.1, 914, 495, 476, 231.41, 248/496, 231.91; 439/310, 567, 352, 350, 439/345; 312/326, 228, 334.24, 334.25, 312/208.1, 405.1, 405, 223.1
See application file for complete search history.

(56) References Cited

U.S. PATENT DOCUMENTS

2007/0014083 A1 *  1/2007  Tanaka et al. ................. 361/683
2014/0077675 A1 *  3/2014  Liang et al. ................... 312/326
2014/0328041 A1 *  11/2014  Rothkopf et al. ............. 361/807

FOREIGN PATENT DOCUMENTS

JP    2004-191917    7/2004

* cited by examiner

*Primary Examiner* — Hung Duong
(74) *Attorney, Agent, or Firm* — Hamre, Schumann, Mueller & Larson, P.C.

(57) ABSTRACT

There is provided an electronic device having a terminal port disposed at a side surface of a casing and opened outward; and a lid that openably covers the terminal port. The terminal port includes: a back wall on which connection terminals are mounted; a bottom wall; and a pair of side walls. The lid includes a slide support that is supported slidably inward and outward along the bottom wall and a lid main body that is turnably supported at the outer edge of the slide support by a hinge. The slide support is located at its initial position at which the slide support slides inward when the lid is closed. The slide support is allowed to slide outward and the hinge is located outward of the outer edge of the bottom wall when the lid is opened.

4 Claims, 7 Drawing Sheets

ELECTRONIC DEVICE

BACKGROUND OF THE INVENTION

1. Field of the Invention

The present disclosure relates to an electronic device and, more particularly, to an electronic device that is provided with a terminal port at a side surface of the casing thereof.

2. Description of the Related Art

As well known, an electronic device such as a personal computer and an information terminal device, in particular, a portable electronic device such as a so-called tablet type or a notebook type computer and a tablet type mobile information terminal is generally provided with a terminal port at a side surface of the casing thereof. The terminal port is provided with a connection terminal to be connected to an external relevant device, a power source or the like.

Such a terminal port is formed so as to be opened outward at the side surface of the casing. Normally, there is additionally provided a lid for closing the terminal port when the connection terminal is not used. Such a lid configured to be capable of freely turning on a hinge positioned at the opening end of the terminal port and capable of being opened or closed according to the turning operation of the lid has been well-known (refer to Japanese Patent Laid-open Publication No. 2004-191917, for example).

SUMMARY OF THE INVENTION

In the case where the lid can be turned on the hinge positioned at the opening end of the terminal port, as described above, the lid can be opened until it becomes to be continued substantially flush with the bottom wall of the terminal port when the lid is turned to be opened during the use of the connection terminal, according to the structures of the terminal port, the lid and the hinge. However, if the lid is to be turned at a larger opening degree, the lid per se may interfere with the side surface of the casing according to the structures of the terminal port, the lid, and the hinge.

In this case, a connector of the external relevant device has to be inserted from the outside along the lid in the state in which the lid is opened so as to be continued substantially flush with the bottom wall of the terminal port, thereby achieving a connecting operation with respect to the connection terminal. This is generally a drawback of a poor operability.

To cope therewith, One non-limiting and exemplary embodiment provides an electronic device capable of turning a lid of a terminal port during the use of a connection terminal and improving operability for connecting a connector of an external relevant device to the connection terminal in the electronic device having a terminal port opened outward at a side surface of a casing.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one general aspect of the present disclosure, there is provided an electronic device including: a casing having, at an outer surface thereof, an upper surface and a lower surface that are disposed opposite to each other, and side surfaces for joining peripheral edges of the upper and lower surfaces; a terminal port disposed at the side surface of the casing and is opened outward of the casing; and a lid configured to openably covers the terminal port, wherein the terminal port includes a back wall on which connection terminals are mounted, a bottom wall extending from the bottom edge of the back wall outward of the casing, and a pair of side walls connecting a side edge of the bottom wall and a side edge of the back wall to each other, the lid includes a slide support that is supported slidably inward and outward of the casing along the bottom wall and a lid main body turnably supported at an outer edge of the slide support by a hinge, and the slide support is located at its initial position at which the slide support slides inward when the lid is closed, whereas the slide support is allowed to slide outward and the hinge is located outward of the outer edge of the bottom wall when the lid is opened.

With the electronic device according to the present disclosure, when the lid of the terminal port is opened, the slide support for supporting the lid main body at the outer edge via the hinge is allowed to slide outward, so that the hinge can be positioned outward of the outer edge of the bottom wall of the terminal port. Consequently, when the lid is turned to be opened for the use of the connection terminal, the lid can be turned to be opened at a greater opening degree than that in the state in which the lid is continued substantially flush with the bottom wall of the terminal port without any interference with the side surface of the casing. Thus the operability can be enhanced when a connector of an external relevant device is connected to the connection terminal.

DETAILED DESCRIPTION

Figure 1:
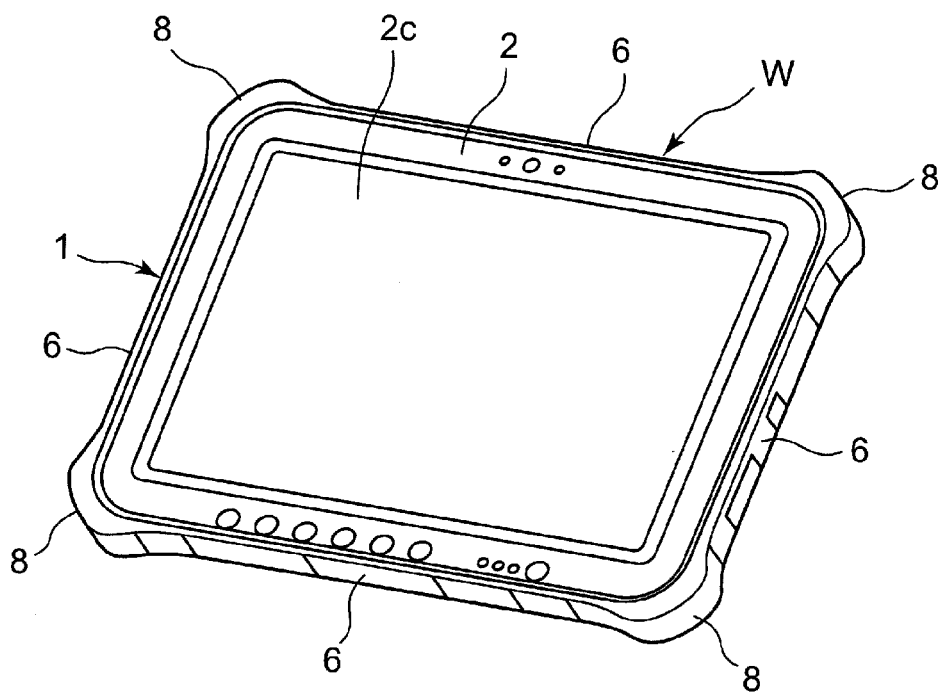
FIG. 1 is a perspective view illustrating a tablet terminal device on a display screen side according to an embodiment of the present disclosure.

An electronic device according to the present disclosure can be embodied in aspects below in addition to the aforementioned basic structure. Specifically, the electronic device may further includes a lid cover disposed slidably in a direction substantially parallel to the back wall of the terminal port along the outer surface of the lid main body, wherein a lock member to be locked in the vicinity of the back wall in the state in which the lid is closed is disposed in the vicinity of the inner edge of the lid cover, and the lid cover is allowed to slide in the direction substantially parallel to the back wall when the lid is opened, thus releasing the locked state with respect to the vicinity of the back wall of the lock member.

With this structure, the lock member of the lid cover is locked in the vicinity of the back wall of the terminal port in the state in which the lid is closed, thus securely keeping the closed state of the lid with respect to the terminal port.

Further, in the aforementioned case, the side wall of the terminal port may be provided with a guide for guiding the turning operation of the lid main body.

With this structure, when the opened lid is turned to be closed with respect to the terminal port, the turning operation of the lid main body is guided by the guide, thus more smoothly closing the lid with respect to the terminal port.

Further, in the aforementioned case, the lid main body may be provided with a sealing member for sealing the connection terminal under pressure onto the back wall of the terminal port in the state in which the lid is closed.

With this structure, liquid such as water, dust, or the like is securely prevented from intruding around the back wall of the terminal port having the connection terminal disposed therein in the state in which the lid is closed, thus effectively protecting the connection terminal.

Embodiments

Hereinafter, an embodiment will be described in detail with reference to the drawings, appropriately. However, descriptions in detail more than necessary may be omitted. For example, matters which have been already well known may not be described in detail, and substantially the same configurations may not be described redundantly. This is for avoiding the following descriptions from being unnecessarily redundant and for allowing those skilled in the art to easily understand them.

Further, the present inventor(s) gives the accompanying drawings and the following descriptions for allowing those skilled in the art to sufficiently understand the present disclosure, and the main theme defined in the claims is not intended to be restricted thereby.

Further, in the following description, terms which denote certain directions (such as "upper", "lower", "left", "right" and other terms including these terms, "clockwise", "counterclockwise") may be used, but the use of them is merely for ease of understanding of the disclosure with reference to the drawings, and the present disclosure should not be restrictively understood by the meanings of these terms.

The embodiment of the present disclosure which will be described later is an example where the present disclosure is applied to a so-called tablet type portable information terminal device (hereinafter, appropriately, referred to as a "tablet terminal device" or simply referred to as a "device").

Figure 2:
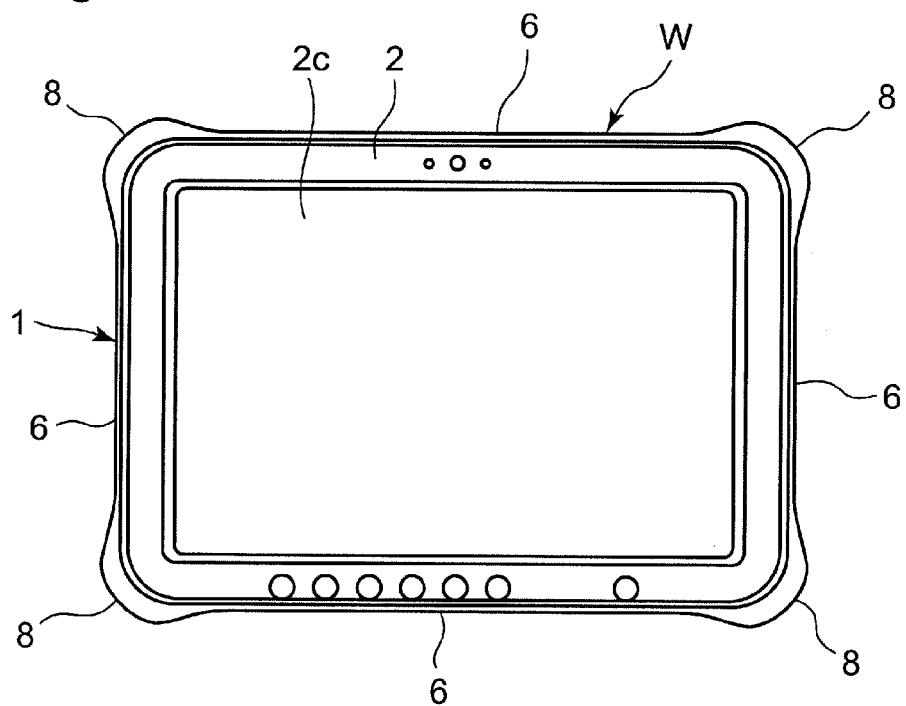
FIG. 2 is a plan view illustrating the tablet terminal device.
Figure 3:
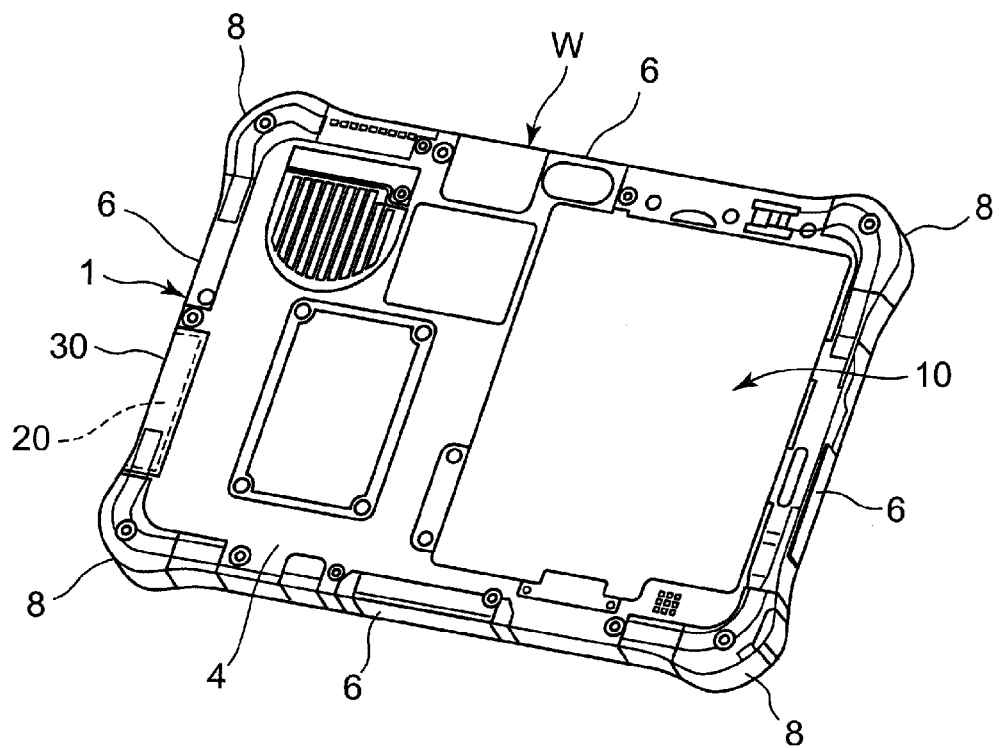
FIG. 3 is a perspective view illustrating the tablet terminal device on a back side.
Figure 4:
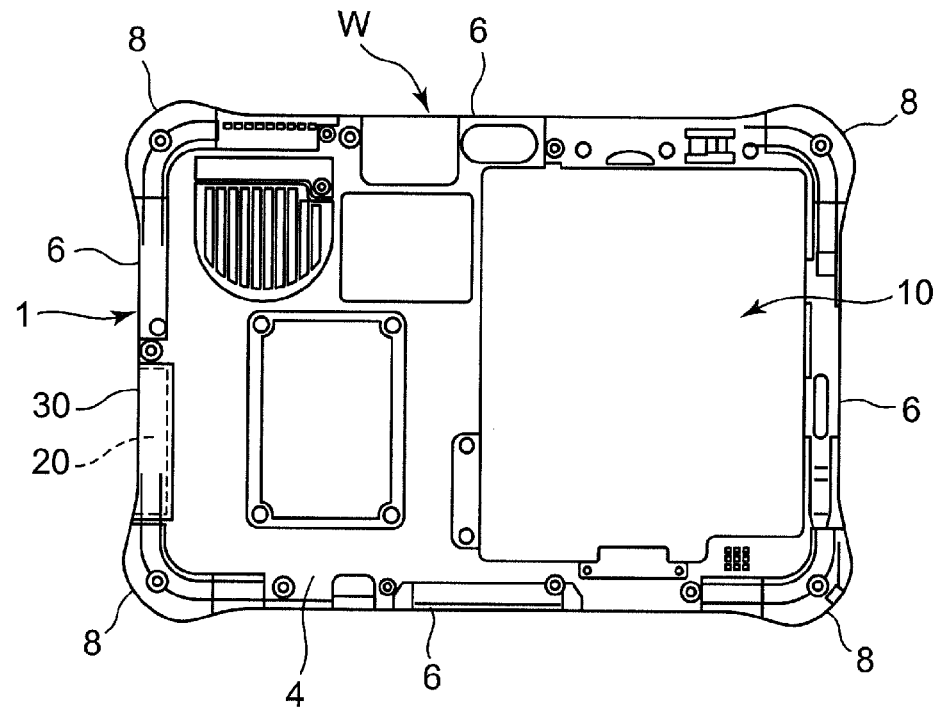
FIG. 4 is a rear view illustrating the tablet terminal device.

FIG. 1 and FIG. 2 are a perspective view and a plan view illustrating a tablet terminal device as the electronic device on a display screen side according to the present embodiment, respectively. Moreover, FIG. 3 and FIG. 4 are a perspective view and a plan view illustrating the tablet terminal device on the back side, respectively.

As illustrated in FIG. 1 to FIG. 4, a tablet terminal device W according to the present embodiment includes a casing 1 that is formed into a substantially quadrangular shape, as viewed on a plane, and has a predetermined thickness (i.e., a predetermined height). The casing 1 has, as its outer surface, an upper surface 2 and a lower surface 4 that are vertically disposed opposite to each other and a side surface 6 for connecting the peripheral edges of the surfaces 2 and 4 to each other. The side surfaces 6 are configured to have two pairs of substantially flat surfaces disposed opposite to each other as essential surfaces.

In the present embodiment, a bulge portion 8 bulging outward of the casing 1 in a curved manner is formed at each of corners of the casing 1, in order to enhance shock resistance when the device W falls down. Essential parts of the casing 1 are made of a metallic material such as magnesium (Mg) so as to secure mechanical rigidity or the like. The four bulge portions 8 are made of a material having a higher elasticity than that of the material of the casing 1, for example, an elastomer. These bulge portions 8 are attached to the corners of the Mg casing 1, and thus, are fixed to the casing 1.

The size and weight of the tablet terminal device W are set so as to ensure the portability thereof. A display screen 2c made of, for example, a liquid crystal is disposed at the upper surface 2 of the casing 1. The display screen 2c is also used as an input screen of a touch panel type. In the meantime, a battery pack 10 serving as a mobile power source is loaded at the lower surface 4 (i.e., a back side) of the casing 1. The battery pack 10 has a predetermined thickness and is formed into a substantially quadrangular shape, as viewed on a plane.

In the present embodiment, a terminal port 20 provided with a connection terminal to be connected to any relevant device (not shown) is disposed at a predetermined position at the side surface 6 of the casing 1 in the tablet terminal device W.

Hereinafter, a description will be given of the structure and the like of the terminal port 20 with reference to FIGS. 5A to 5D and FIGS. 6A to 6D. FIGS. 5A to 5D are a series of perspective views illustrating the terminal port 20 and a lid 30 therefor; and further, FIGS. 6A to 6D are a series of side views illustrating the terminal port 20 and the lid 30 therefor.

Figure 5A:
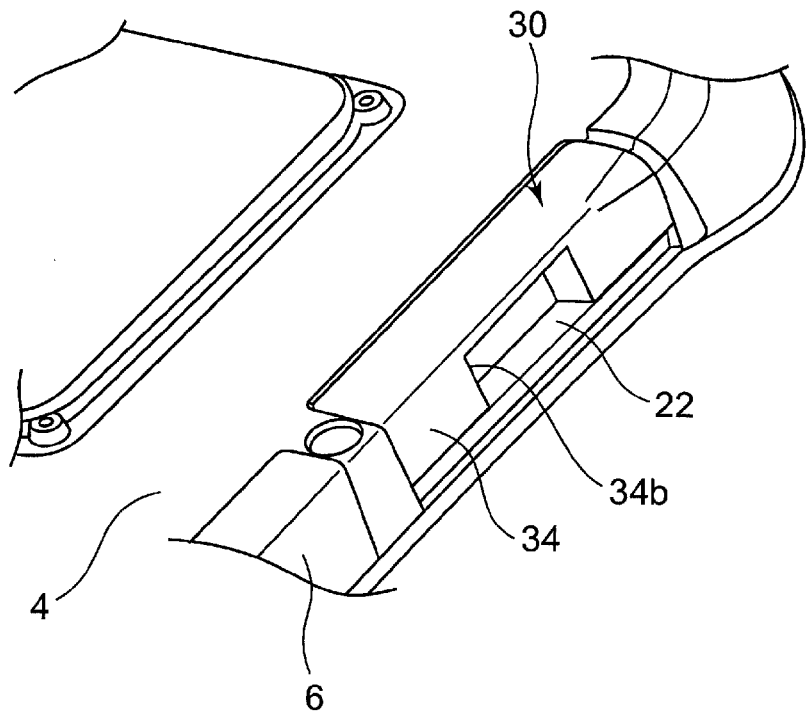
FIG. 5A is a perspective view illustrating the state in which a terminal port in the tablet terminal device is closed by a lid.
Figure 5B:
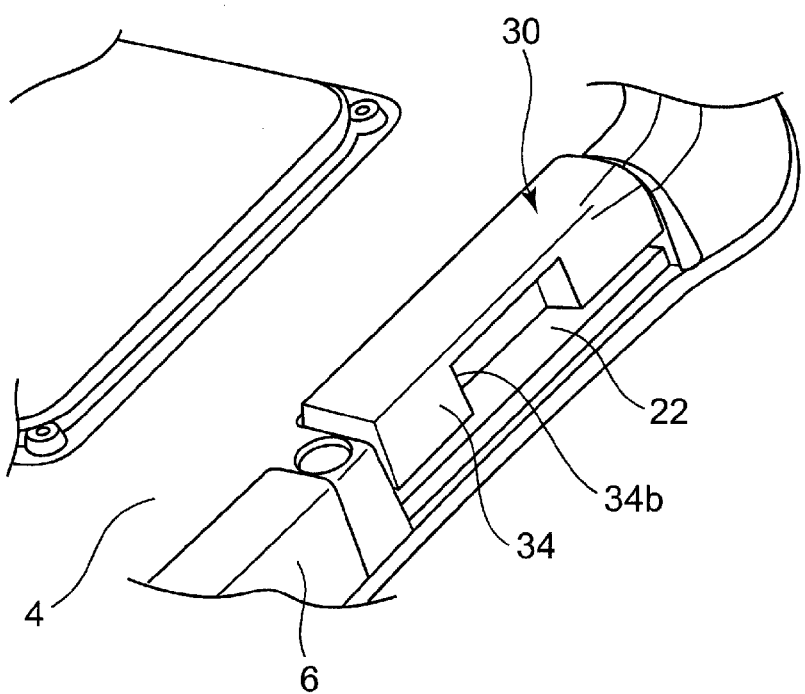
FIG. 5B is a perspective view illustrating the state in which the lid is unlocked.
Figure 5C:
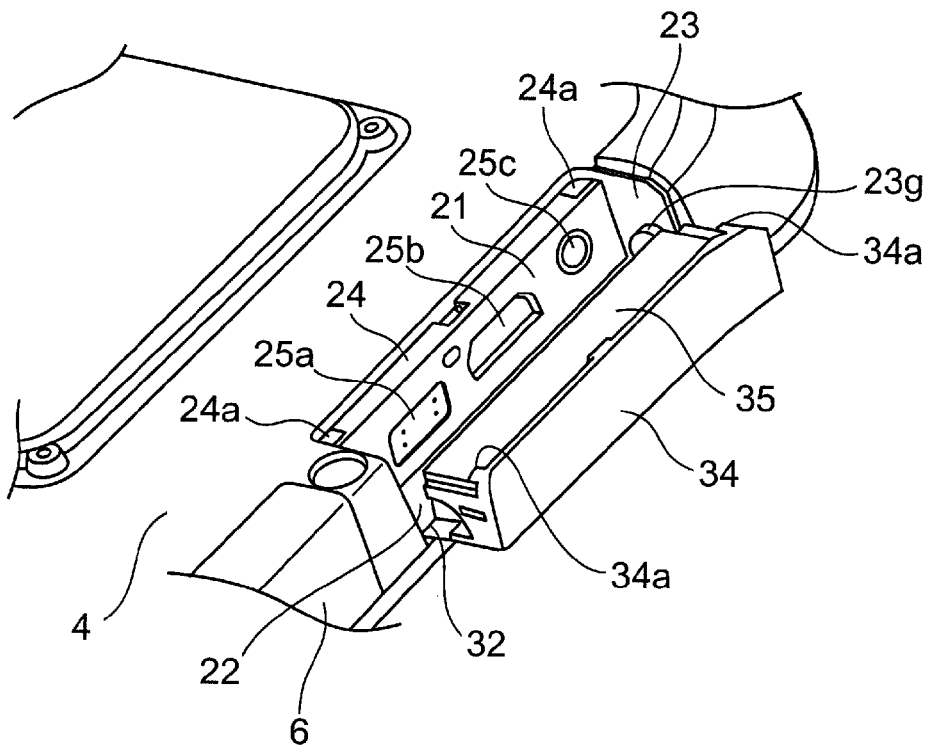
FIG. 5C is a perspective view illustrating the state in which the lid is turned to be opened.
Figure 5D:
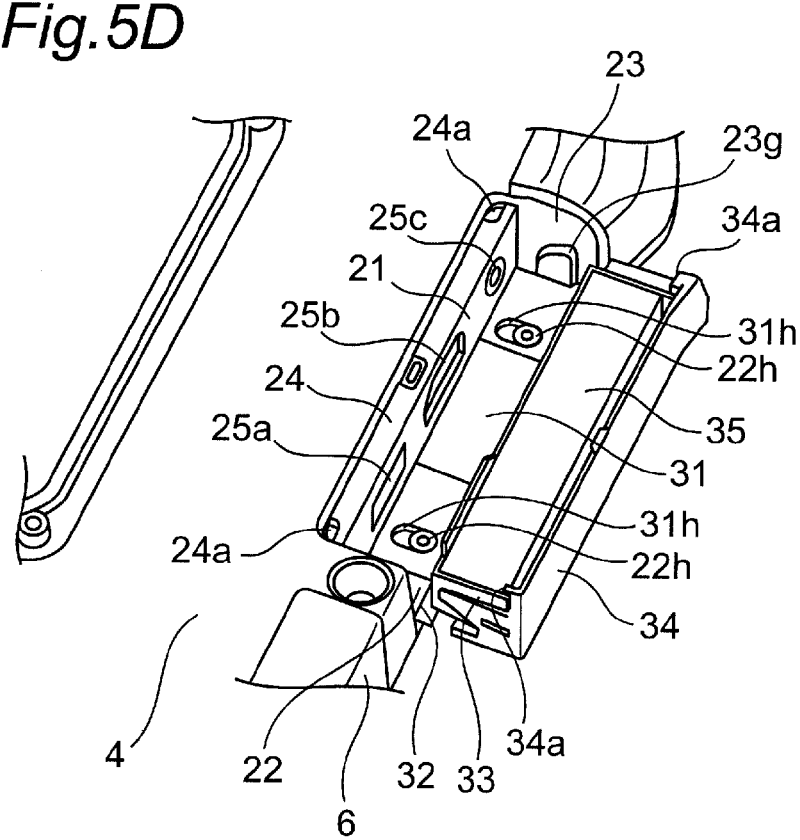
FIG. 5D is a perspective view illustrating the state in which a slide support in the lid is located inward.
Figure 5E:
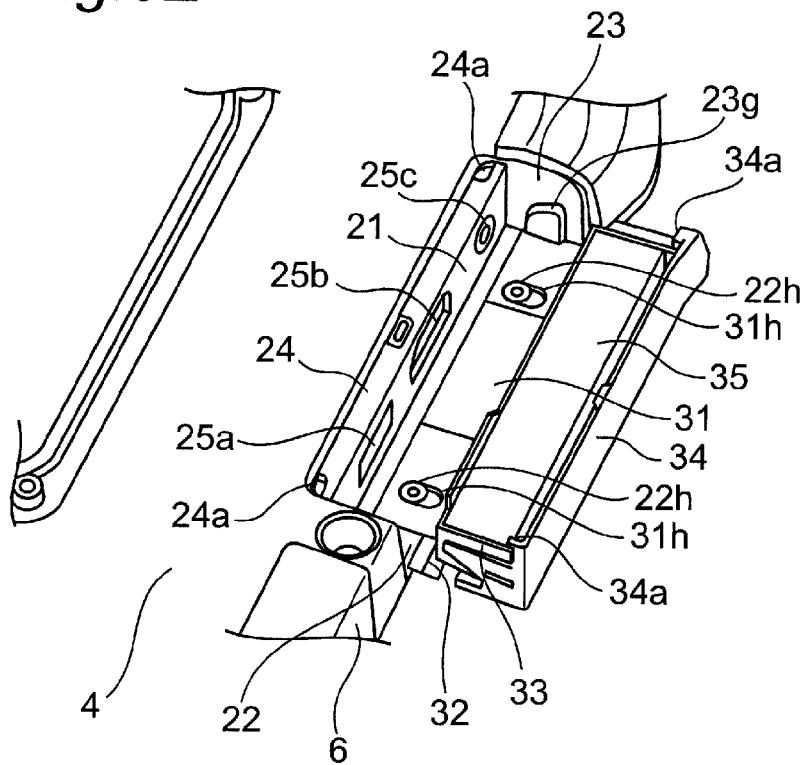
FIG. 5E is a perspective view illustrating the state in which the slide support is allowed to slide outward.

As illustrated in FIGS. 5C to 5E, the terminal port 20 located at the predetermined position of the side surface 6 of the casing 1 is opened outward of the casing 1. The lid 30 is provided for openably closing the opening. The terminal port 20 includes a back wall 21, on which a plurality of (three in the present embodiment) connection terminals 25a, 25b, and 25c are arranged, a bottom wall 22 extending from the bottom edge of the back wall 21 outward of the casing 1, and a pair of side walls 23, each of which connects the side edge of the bottom wall 22 to the side edge of the back wall 21.

The lid 30 is provided with a slide support plate 31 that is supported slidably inward and outward of the casing 1 along the bottom wall 22 of the terminal port 20, and a lid main body 33 turnably supported at the outer edge of the slide support plate 31 via a hinge 32. The slide support plate 31, the hinge 32, and the lid main body 33 are integrally molded with, for example, a synthetic resin. At the slide support plate 31 are formed, for example, a pair of slots 31h elongated inward and outward of the casing 1. These slots 31h and 31h are engaged with guide projections 22g and 22g projecting from the bottom wall 22 of the terminal port 20.

When force is applied to the lid 30 (i.e., the slide support plate 31) outward or inward, the slots 31h and 31h are guided by the guide projections 22h and 22h while the slide support plate 31 can be adapted to slide outward or inward of the casing 1 along the bottom wall 22. In the state in which the lid 30 is closed, the slide support plate 31 is located at an initial position in which it has slid inward (see FIG. 5D). In contrast, when the lid 30 is opened, the slide support plate 31 is allowed to slide outward by the length of each of the slots 31h and 31h (see FIG. 5E). Consequently, the hinge 32 disposed at the outer edge of the slide support plate 31 is located outward of the outer edge of the bottom wall 22 of the terminal port 20.

The lid main body 33 is formed into a box member of a rectangular parallelepiped having an opening on a side facing the back wall 21 of the terminal port 20 in the state in which the lid 30 is closed. Inside of the box member 33 is disposed a sealing member 35 (a sealing material) made of, for example, rubber, for sealing the connection terminals 25a, 25b, and 25c under pressure onto the back wall 21 of the terminal port 20 in the state in which the lid 30 is closed.

Since the sealing member 35 is disposed at the lid 30, it is possible to securely prevent liquid such as water, dust, or the like from intruding on the back wall 21 of the terminal port 20 at which the connection terminals 25a, 25b, and 25c are disposed in the state in which the lid 30 is closed, thus effectively protecting the connection terminals 25a, 25b, and 25c.

Moreover, the lid 30 is provided with a lid cover 34 disposed slidably in a direction substantially parallel to the back wall 21 of the terminal port 20 along the outer surface of the lid main body 33 in the state in which the lid 30 is closed. At the outer surface of the lid cover 34, an operating recess 34b that is used in opening or closing the lid 30 by a user (see FIGS. 5A and 5B) is formed. Moreover, a pair of lock portions 34a and 34a is formed so as to project in the vicinity of the inner edge of the lid cover 34. Those lock portions 34a and 34a are held (locked) in the vicinity of the back wall 21 in the state in which the lid 30 is closed. In the meantime, a pair of engagement holes 24a and 24a is formed at a flat portion 24 at the upper edge of the back wall 21 of the terminal port 20. The pair of engagement holes 24a and 24a engages with and locks the lock portions 34a and 34a when the lid 30 is closed.

When the closed lid 30 is opened, the lid cover 34 is allowed to slide in the direction substantially parallel to the back wall 21 (i.e., upward in FIGS. 5A, 5B, 6A, and 6B), thereby unlocking the lock portions 34a and 34a from the vicinity of the back wall 21. In order to guide the upward sliding operation of the lid cover 34, as shown in FIGS. 6A to 6D, an elongated groove 34h is formed at the side surface of the lid cover 34, and further, a guide piece 33h is provided at the side surface of the lid main body 33. The guide piece 33h is to slide in a longitudinal direction of the elongated groove 34h in engagement therewith.

As described above, the lock portions 34a and 34a of the lid cover 34 are locked in the vicinity (i.e., the engagement holes 24a and 24a) of the back wall 21 of the terminal port 20 in the state in which the lid 30 is closed, thereby securely keeping the lid 30 in the closed state with respect to the terminal port 20.

Furthermore, guides 23g and 23g for guiding the turning motion of the lid main body 33 when the lid 30 is turned are provided on the side walls 23 and 23 of the terminal port 20 (only either one is shown in FIGS. 5A to 5C). The guides 23g and 23g are raised from the side walls 23 and 23, respectively, to inside of the opening of the terminal port 20. Each of the guide edges (i.e., upper edges) of the guides 23g and 23g constitutes a part of an arc. In the meantime, projections 33g and 33g to be guided that correspond to the guides 23g and 23g are provided at the side surfaces of the lid main body 33 (only either one is shown in FIGS. 6A to 6D). The projections 33g and 33g project from the side surfaces of the lid main body 33, and thus, are configured such that the side edges of the projections 33g and 33g are guided along the arcs at the upper edges of the guides 23g and 23g when the lid 30 is turned.

As described above, the guides 23g and 23g are provided on the side walls 23 and 23 of the terminal port 20, and further, the projections 33g and 33g to be guided are provided at the side surfaces of the lid main body 33. Consequently, when the open lid 30 is turned to be closed with respect to the terminal port 20, the turning motion of the lid main body 33 is guided by the guides 23g and 23g, so that the lid 30 can be smoothly closed with respect to the terminal port 20 even in the case where the hinge 32 of the lid 30 is drawn outward of the outer edge of the bottom wall 22 of the terminal port 20.

With the above-described configuration, a sequential description will be given of an operation for opening the terminal port 20 by turning the lid 30 in the closed state with reference to FIGS. 5A to 5E and FIGS. 6A to 6D.

Figure 6A:
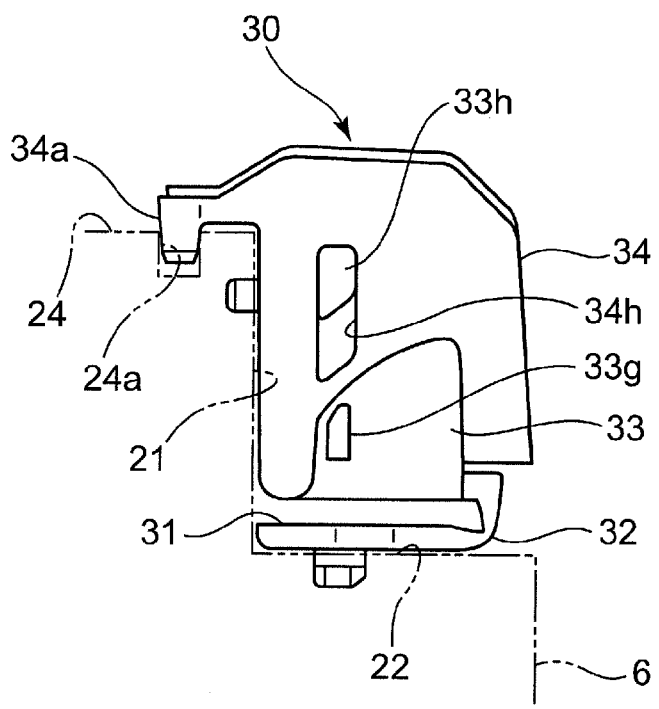
FIG. 6A is a side view illustrating the state in which the terminal port is closed by the lid.

The lock portions 34a and 34a of the lid cover 34 are locked in the vicinity (i.e., the engagement holes 24a and 24a) of the back wall 21 of the terminal port 20 in the state in which the lid 30 is closed, as shown in FIG. 5A and FIG. 6A, and thus, the lid 30 is securely kept closed with respect to the terminal port 20.

Figure 6B:
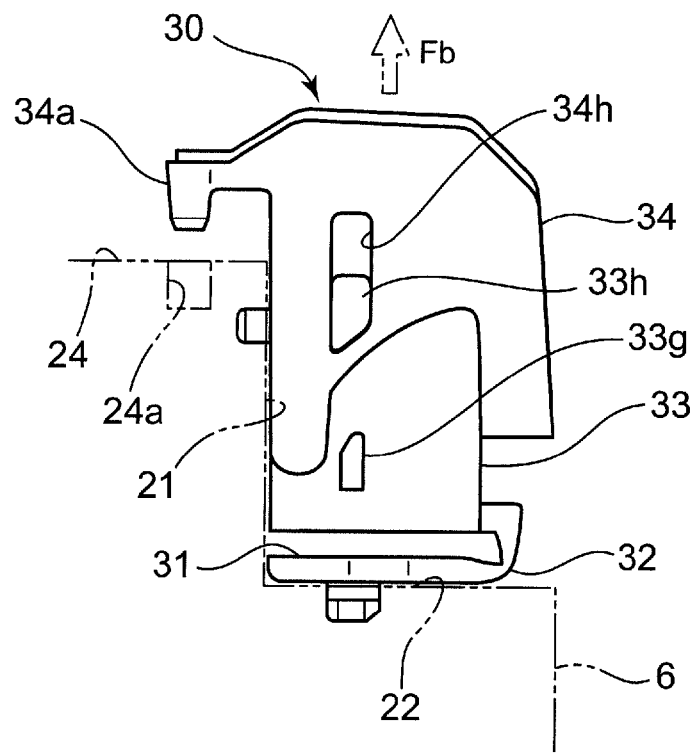
FIG. 6B is a side view illustrating the state in which the lid is unlocked.

When the lid 30 in the closed state is opened, as shown in FIG. 5B and FIG. 6B, the lid 30 is lifted in a direction indicated by an arrow Fb in FIG. 6B by a finger hooked in the operating recess 34b of the lid cover 34. In this manner, the lock portions 34a and 34a of the lid cover 34 are withdrawn from the engagement holes 24a and 24a in the vicinity of the back wall 21 of the terminal port 20, thus releasing the locked state of the lid 30.

Figure 6C:
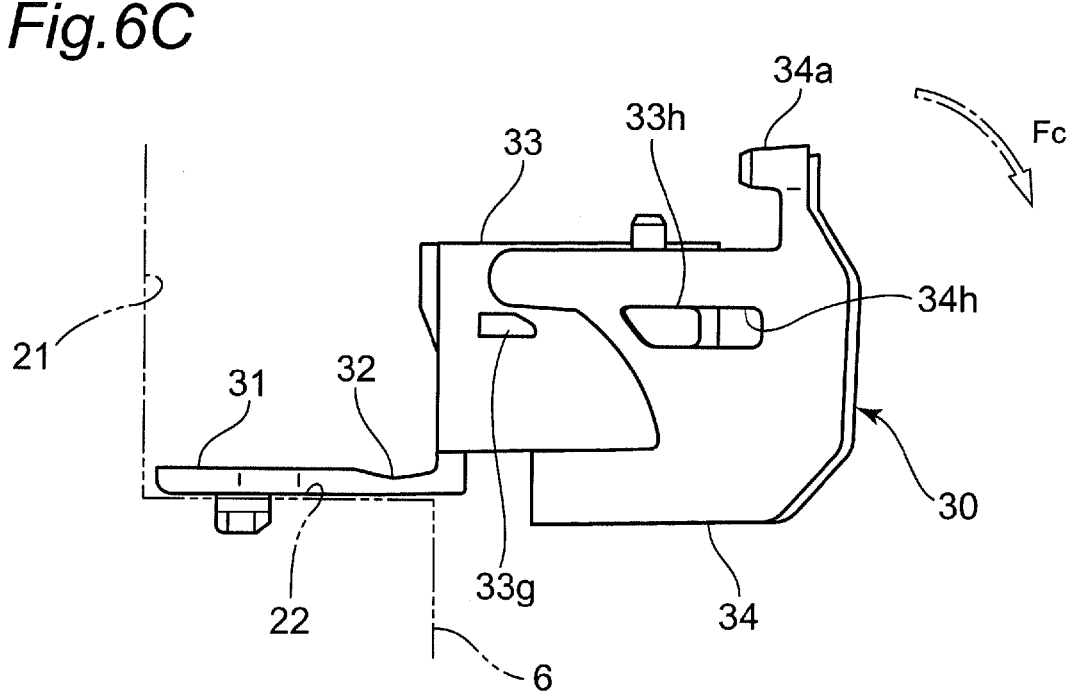
FIG. 6C is a side view illustrating the state in which the lid is opened and the slide support is located inward.

Next, the lid 30 is turned at approximately 90° in a direction indicated by an arrow Fc in FIG. 6C, as shown in FIG. 5C and FIG. 6C. In this manner, the terminal port 20 is opened, and the lid 30 is opened until it becomes substantially flush with the bottom wall 22 of the terminal port 20. At this time, the slide support plate 31 of the lid 30 is located at its initial position inward on the bottom wall 22 of the terminal port 20 (see FIG. 5D).

Thereafter, or while the lid 30 is turned, the lid 30 is withdrawn outward, thereby the slide support plate 31 is allowed to slide outward by the length of each of the slots 31h and 31h (see FIG. 5E). As a consequence, the hinge 32 disposed at the outer edge of the slide support plate 31 is located outward of the outer edge of the bottom wall 22 of the terminal port 20.

Figure 6D:
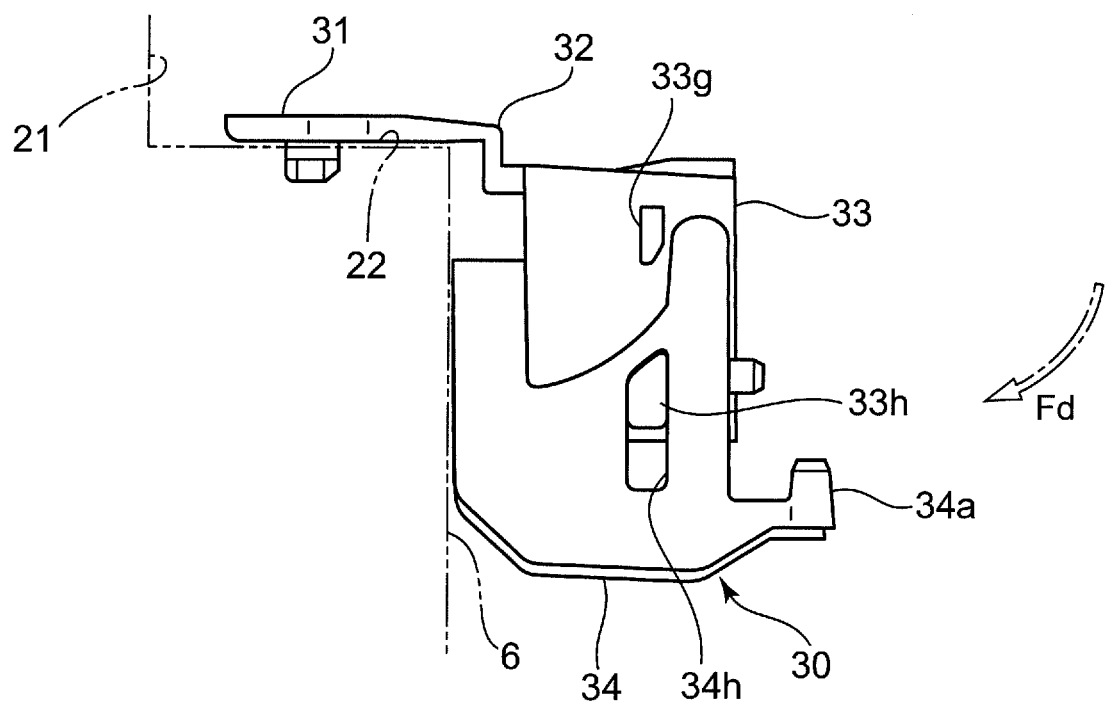
FIG. 6D is a side view illustrating the state in which the lid is opened at a larger opening degree than that in a horizontal state.

Hence, in this state, the lid 30 can be further turned at approximately 90° in a direction indicated by an arrow Fd in FIG. 6D. Consequently, when the lid 30 is turned to be opened for the use of the connection terminals 25a, 25b, and 25c, the lid 30 can be turned to be opened at a greater angle than that in the state in which the lid 30 is continued substantially flush with the bottom wall 22 of the terminal port 20 without any interference with the side surface 6 of the casing 1. Thus, the operability can be enhanced when the connector (not shown) of the external relevant device is connected to the connection terminals 25a, 25b, and 25c.

As described above, the present embodiment has been described as an example of the technique of the present disclosure. For the purpose of this, the attached drawings and the detailed explanation have been provided.

As a consequence, the constituent elements in the attached drawings and the detailed explanation include not only constituent elements essential for solving a problem to be solved but also constituent elements that are just essential for illustrating the technique but inessential for solving a problem to be solved. Although such inessential constituent elements appear in the attached drawings and the detailed explanation, the inessential constituent elements are not regarded as being essential.

Although the above-described embodiment has been applied to the so-called tablet terminal device, the electronic device according to the present disclosure is not limited to this embodiment but can be effectively applied to other various kinds of electronic devices.

In this manner, the above-described embodiment is adapted only to illustrate the technique according to the present disclosure, and therefore, it can be variously changed, replaced, added, and omitted within the scope of claims or its equivalent scope.

INDUSTRIAL APPLICABILITY

The present disclosure is applicable to the electronic device that is provided with a terminal port at a side surface of the casing thereof.

What is claimed is:

1. An electronic device comprising:
a casing having, at an outer surface thereof, an upper surface and a lower surface that are disposed opposite to each other, and side surfaces for joining peripheral edges of the upper and lower surfaces;
a terminal port disposed at the side surface of the casing and opened outward of the casing; and
a lid configured to openably covers the terminal port, wherein
the terminal port includes a back wall on which connection terminals are mounted, a bottom wall extending from the bottom edge of the back wall outward of the casing, and a pair of side walls connecting a side edge of the bottom wall and a side edge of the back wall to each other,
the lid includes a slide support that is supported slidably inward and outward of the casing along the bottom wall, and a lid main body turnably supported at an outer edge of the slide support by a hinge, and
the slide support is located at its initial position at which the slide support slides inward when the lid is closed, whereas the slide support is allowed to slide outward and the hinge is located outward of an outer edge of the bottom wall when the lid is opened.

2. The electronic device according to claim 1, further comprising a lid cover disposed slidably in a direction substantially parallel to the back wall of the terminal port along an outer surface of the lid main body, wherein
a lock member to be locked in a vicinity of the back wall when the lid is closed is disposed in a vicinity of an inner edge of the lid cover, and
the lid cover is allowed to slide in the direction substantially parallel to the back wall when the lid is opened, releasing the locked state with respect to the vicinity of the back wall of the lock member.

3. The electronic device according to claim 1, wherein the side wall of the terminal port includes a guide for guiding the turning operation of the lid main body.

4. The electronic device according to claim 1, wherein the lid main body is provided with a sealing member for sealing the connection terminal under pressure onto the back wall of the terminal port in the state in which the lid is closed.

* * * * *